(12) United States Patent
Ribeiro et al.

(10) Patent No.: US 9,841,905 B2
(45) Date of Patent: Dec. 12, 2017

(54) FILE SYSTEM HAVING A DATABASE MANAGEMENT SYSTEM USING FILE PRE-ALLOCATION IN MASS STORAGE DEVICES

(71) Applicant: PKNOA, S.A., Evora (PT)

(72) Inventors: Ricardo Miguel da Silva Teresa Ribeiro, Vendas Novas (PT); Wilson Edgar Wintacem Pinto, Evora (PT)

(73) Assignee: PKNOA S.A., Evora (PT)

(*) Notice: Subject to any disclaimer, the term of this patent is extended or adjusted under 35 U.S.C. 154(b) by 23 days.

(21) Appl. No.: 14/983,337

(22) Filed: Dec. 29, 2015

(65) Prior Publication Data
US 2017/0185317 A1 Jun. 29, 2017

(51) Int. Cl.
G06F 3/06 (2006.01)
G06F 17/30 (2006.01)

(52) U.S. Cl.
CPC ............ *G06F 3/0611* (2013.01); *G06F 3/061* (2013.01); *G06F 3/064* (2013.01); *G06F 3/0608* (2013.01); *G06F 3/0638* (2013.01); *G06F 3/0643* (2013.01); *G06F 3/0673* (2013.01); *G06F 17/30135* (2013.01); *G06F 17/30312* (2013.01); *G06F 17/30492* (2013.01)

(58) Field of Classification Search
None
See application file for complete search history.

(56) References Cited

U.S. PATENT DOCUMENTS

| | | | |
|---|---|---|---|
| 4,633,387 A | 12/1986 | Hartung et al. | |
| 5,239,469 A | 8/1993 | McBride et al. | |
| 5,930,828 A | 7/1999 | Jensen | |
| 6,105,117 A | 8/2000 | Ripley | |
| 6,137,875 A | 10/2000 | Mo | |
| 6,434,663 B1 | 8/2002 | Grimsrud et al. | |
| 6,742,080 B1 | 5/2004 | Grimsrud et al. | |
| 6,941,423 B2 | 9/2005 | Coulson | |
| 7,275,135 B2 | 9/2007 | Coulson | |
| 7,308,531 B2 | 12/2007 | Coulson | |

(Continued)

OTHER PUBLICATIONS

Anonymous: "File system fragmentation"—Wikipedia, Dec. 14, 2015 (Dec. 14, 2015), XP055367749, Retrieved from the Internet: URL:https://en.wikipedia.org/w/index.php?t itle=File-system-fragmentation&oldid=69522 3835 [retrieved on Apr. 26, 2017] First paragraph; Section "Preventing fragmentation"; Section "Notes".

(Continued)

*Primary Examiner* — Denise Tran
(74) *Attorney, Agent, or Firm* — Porzio Bromberg & Newman P.C.

(57) ABSTRACT

The present invention relates to a computer implemented method and database management system for storing data on a storage device. A plurality of empty files at the storage device is pre-allocated in a processor of the database management system. Each of the empty files has a pre-determined file size. The empty files are overwritten sequentially with a plurality of data blocks. Each of the data blocks having a pre-determined size. The present invention relates to a database management system (DBMS) that coordinates both the physical and the logical components of data management.

16 Claims, 11 Drawing Sheets

(56) References Cited

U.S. PATENT DOCUMENTS

| | | | |
|---|---|---|---|
| 2004/0148476 A1 | 7/2004 | Altare | |
| 2008/0235479 A1* | 9/2008 | Scales | G06F 3/0608 |
| | | | 711/166 |
| 2012/0303858 A1* | 11/2012 | Ginzton | G06F 9/45533 |
| | | | 711/6 |
| 2015/0089138 A1* | 3/2015 | Tao | G06F 12/0806 |
| | | | 711/119 |

OTHER PUBLICATIONS

Anonymous: "#849 (preallocation to prevent fragmentation)—Transmission", trac.transmissionbt.com,xAAA Jan. 1, 2009 (Jan. 1, 2009), XP055367770,Retrieved from the Internet:URL:https://trac.transmissionbt.com/ ticket /849.

Anonymous: "How do you pre-allocate space for a file in C/C++ on Windows?—StackOverflow", http://stackoverflow.com, Sep. 7, 2015 (Sep. 7, 2015), XP055367779, Retrieved from the Internet: URL:https://web-beta.archive.org/web/2015 0907114830/http://stackoverflow.com/questions/7970333/how-do-you-pre-allocate-space-for-a-file-in-c-c-on-windows.

Bob Cromwel 1: "Avoid Fragmentation: Newer is Better : Learning Tree Blog", http://blog.learningtree.com, Nov. 25, 2015 (Nov. 25, 2015), XP0553677 44, Retrieved from the Internet:URL:http://blog.learningtree.com/avoid-fragmentation-newer-better/ [retrieved on Apr. 26, 2017] the whole document.

International Search Report, PCT/PT2016/050029, dated May 4, 2017.

* cited by examiner

FILE SYSTEM HAVING A DATABASE MANAGEMENT SYSTEM USING FILE PRE-ALLOCATION IN MASS STORAGE DEVICES

BACKGROUND OF THE INVENTION

Field of the Invention

The present invention relates generally to data storage and more specifically but not exclusively to a database management system including file pre-allocation of data storage devices.

Description of Related Art

The slow mechanical nature of input/output (I/O) devices such as disks compared to the speed of electronic processing has made I/O devices a major bottleneck in computer systems. As the improvement in processor performance continues to far exceed the improvement in disk access time, the I/O bottleneck is becoming more significant.

Mass storage devices are commonly viewed as providing a series of addressable locations, also described as blocks, in which data can be stored.

Different programs require different amounts of memory. If the program requires more, for instance, 2 MB but the operative system cannot find a continuous block of 2 MB, the operative system will allocate more than one block until it reaches 2 MB, which leads to a fragmentation problem.

Fragmentation is a problem that affects both volatile memory as well as the mass storage devices. When a host program asks the operative system to store a file, if the file size is larger than that of the available continuous memory, different disk sections will be used to store the blocks and fragmentation will occur. Thus, fragmentation can be defined when data blocks that compose the data object are not all physically adjacent to each other. Fragmented data causes the overall system to slow down since it requires more computations to access data in its entirety.

Data storage operation speed is also related with the hierarchical directory structure that file systems use to organize the files on the storage devices. In fact, the logic and procedures used to keep the file system within the storage provided by an underlying mass storage device have a profound effect in speed and efficiency.

File system is defined herein as a set of interrelated data structures that are used to divide the storage available between a plurality of data files.

Currently the host operating system is responsible for allocating working memory for guest applications. These guest applications make requests to the underlying operating system for memory and then return it when not in use.

The host operating system is also responsible for making sure there is available memory for all running programs. When some guest applications require more random access memory (RAM) than currently available the operating system might choose to use the virtual memory to mitigate and still allow the system to run.

When a guest application requests a file from disk, this request is forwarded to the operating system which then loads the entire file into memory and then makes the list of memory addresses available to the guest application.

To increase effective disk performance, processes have been described where reorganization of data blocks on a disk are based on the anticipation as to which data blocks are likely to be accessed together by the users. United States patent application publication number 2004/0088504 A1 discloses an autonomic storage system that continually analyses I/O request patterns to optimize the layout of data on a storage device, such as a disk drive, to increase the system performance.

Similar reallocation approaches have been widely discussed in the literature. Particularly, Intel Corporation have employed a great deal of effort in the optimization/performance of mass storage devices mainly based in data block relocation methodologies and applications, as disclosed in U.S. Pat. Nos. 6,105,117; 6,137,875; 6,434,663; and 6,742,080 and in cache optimization techniques, as disclosed in U.S. Pat. Nos. 6,941,423; 7,275,135; and 7,308,531.

Prior analysis of the operation of the disk array storage device before loading a particular data set and then determining an appropriate location for that data are also a trend in addressing the performance optimization problem of mass storage devices. Load balancing techniques aim to optimize resource use, maximize throughput, minimize response time, and avoid overload of any single resource.

U.S. Pat. No. 4,633,387, entitled "Load Balancing in a Multiunit System", discloses load balancing in a multi-unit data processing system in which a guest application operates with multiple disk storage units through plural storage directors. Also, U.S. Pat. No. 5,239,649, entitled "Channel Path Load Balancing, Through Selection of Storage Volume to be Processed, For Long Running Applications", discloses a system for balancing the load on channel paths during long running applications.

It is commonly accepted that data allocation has a profound impact on the quality of the operational efficiency of the computer system. However, most of these data allocation approaches have been proposed prior to the design of a database. The problem of these approaches is that they are sub-optimal solutions, since the demand for computer systems availability; autonomy and dynamic networking make the access probabilities of nodes to data blocks to change over time, therefore degrading the database performance.

Accordingly, there is a need in the art for a more effective data allocation process in (I/O) storage devices, as well as for an improved database logic and design, which render disk access times much faster than in prior art systems.

SUMMARY OF THE INVENTION

The present invention relates to a computer implemented method and database management system for storing data on a storage device. A plurality of empty files at the storage device is pre-allocated in a processor of the database management system. Each of the empty files has a pre-determined file size. The empty files are overwritten sequentially with a plurality of data blocks. Each of the data blocks having a pre-determined size.

In one embodiment, the data blocks are defined by an event. The event can comprise an expression having at least three fields, the fields being a unit, an action and a date. An agent that created the event can be assigned to the event. A subject to which the event concerns can be assigned to the event. The overwritten data blocks are retrieved based on one or more of the expression, the agent and the subject.

In one embodiment, an actor is assigned to either the agent or the subject. The events the actor has access to are grouped as a perspective. The overwritten data blocks are retrieved based on the perspective.

The present invention relates to a database management system (DBMS) that coordinates both the physical and the logical components of data management. The invention is aimed to perform in high volume transactions per second manner for data insertion, update and retrieval.

The physical component solves the fragmentation problem therefore improving the related system speed, by pre-allocating storage for fixed size data blocks, thus creating unfragmented data objects that can be accessed more quickly than normal fragmented objects.

BRIEF DESCRIPTION OF THE DRAWINGS

In the following the invention will be described with reference to the accompanying drawings, wherein.

DETAILED DESCRIPTION OF THE INVENTION

Even though both physical and logical components of the database are interconnected, the following description will address them separately for easier understanding.

Figure 1:
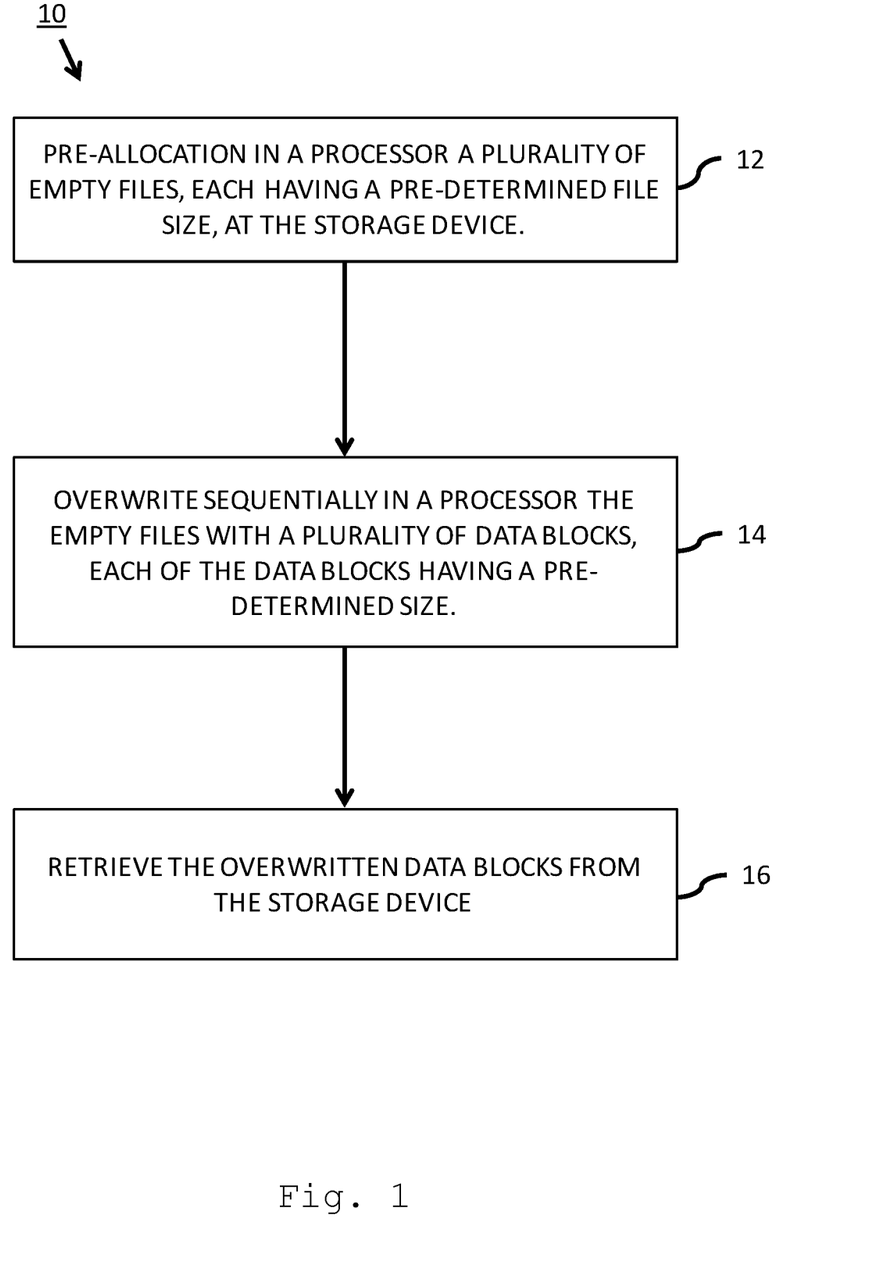
FIG. 1 is a flow diagram of a computer implemented method for storing data on a storage device in accordance with the teachings of the present invention.

FIG. 1 is a flow diagram of a computer implemented method for storing data 10 on a storage device. At step 12, a plurality of empty files at the storage device are pre-allocated in a processor. Each of the empty files having a pre-determined file size. At step 14, the empty files are overwritten sequentially with a plurality of data blocks, each of the data blocks having a pre-determined size. At step 16, the overwritten data blocks are retrieved from the storage device.

Figure 2:
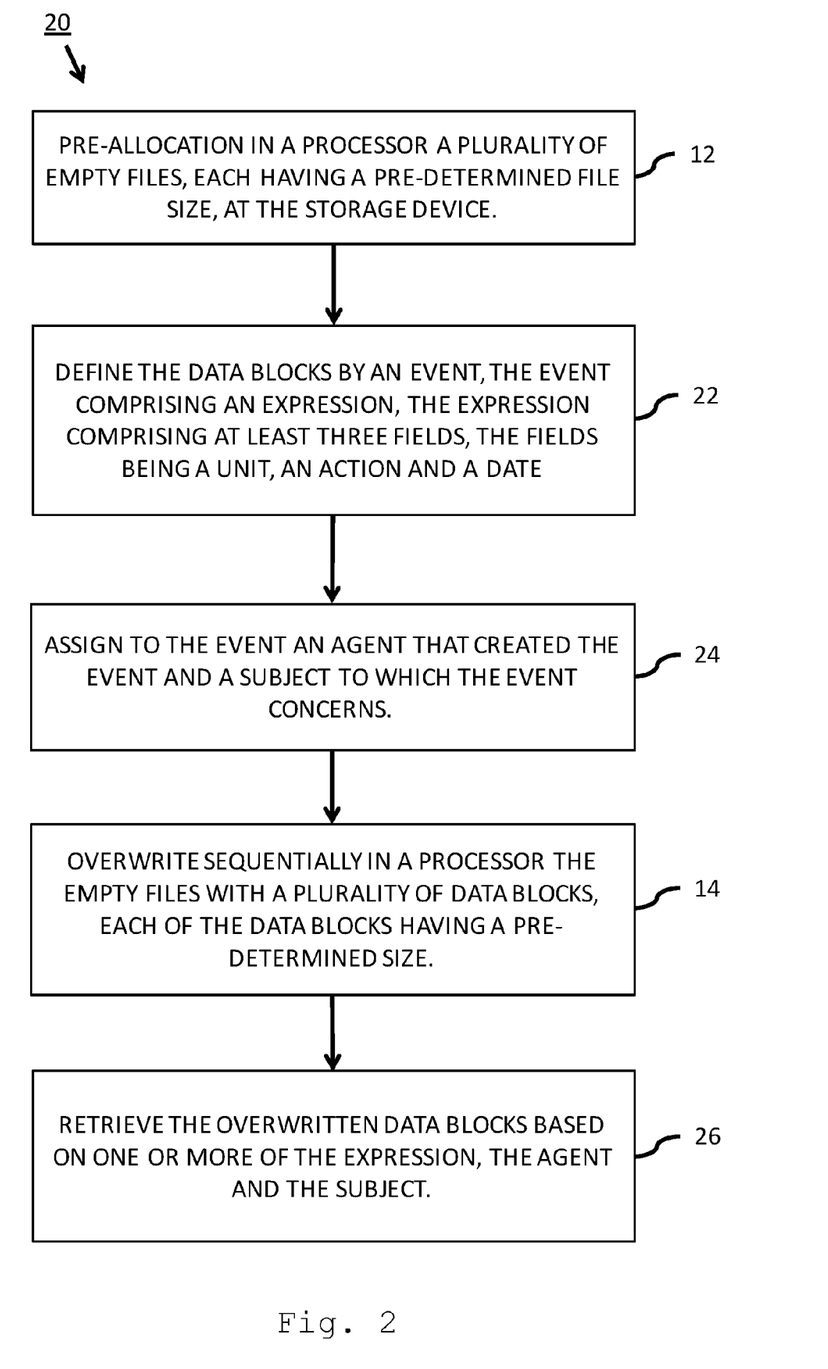
FIG. 2 is a flow diagram of an embodiment of the computer implemented method.

FIG. 2 is a flow diagram of an embodiment of method 10. At step 22, the data blocks are defined by an event. The event can comprise an expression. The expression can have at least three fields, the fields being a unit, an action and a date. The date is a date related to the event. In step 24, an agent that created the event can be assigned to the event. A subject to which the event concerns can be assigned to the event. In step 26, the overwritten data blocks are retrieved based on one or more of the expression, the agent and the subject.

Figure 3:
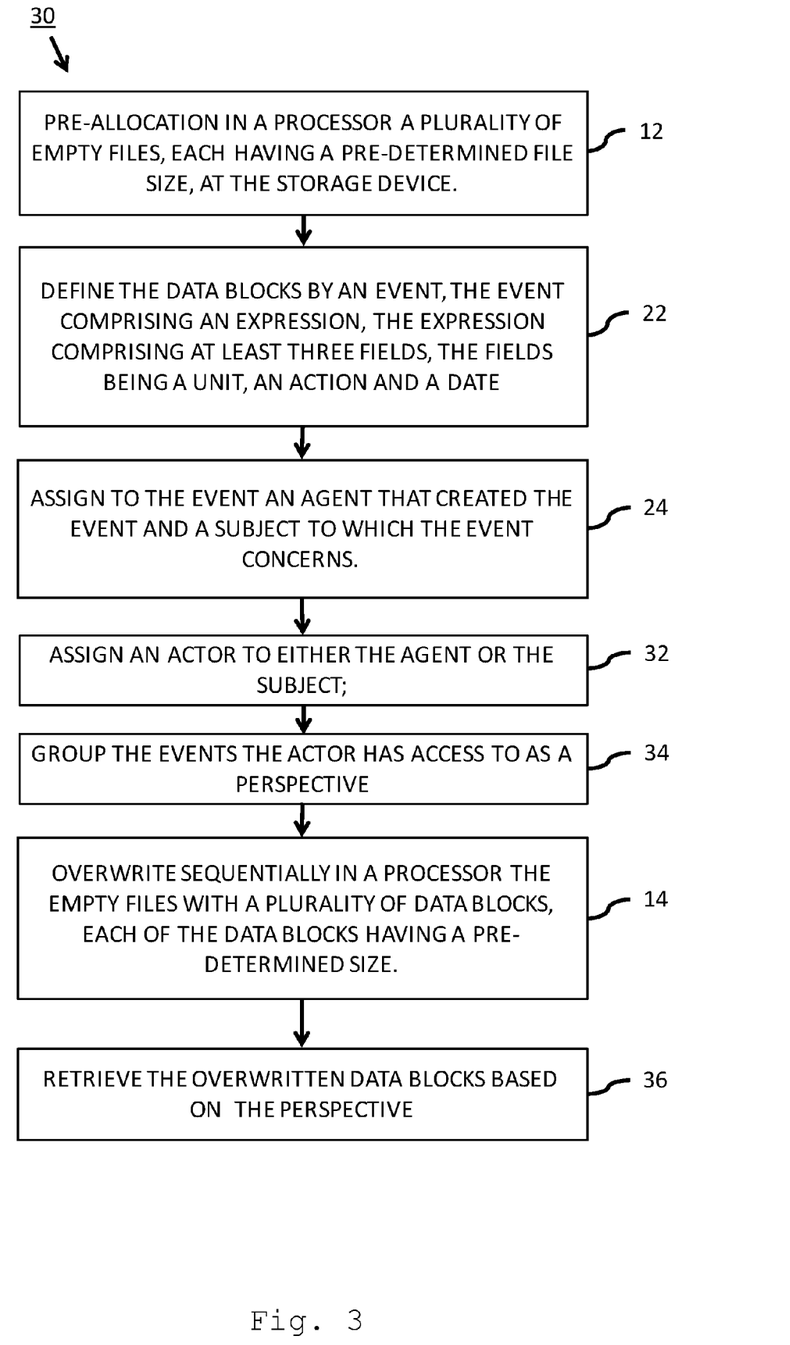
FIG. 3 is a flow diagram of another embodiment of the computer implemented method.

FIG. 3 is a flow diagram of another embodiment of method 10. At step 32, an actor is assigned to either the agent or the subject. At step 34, the events the actor has access to are grouped as a perspective. At step 36, the overwritten data blocks are retrieved based on the perspective.

Figure 4:
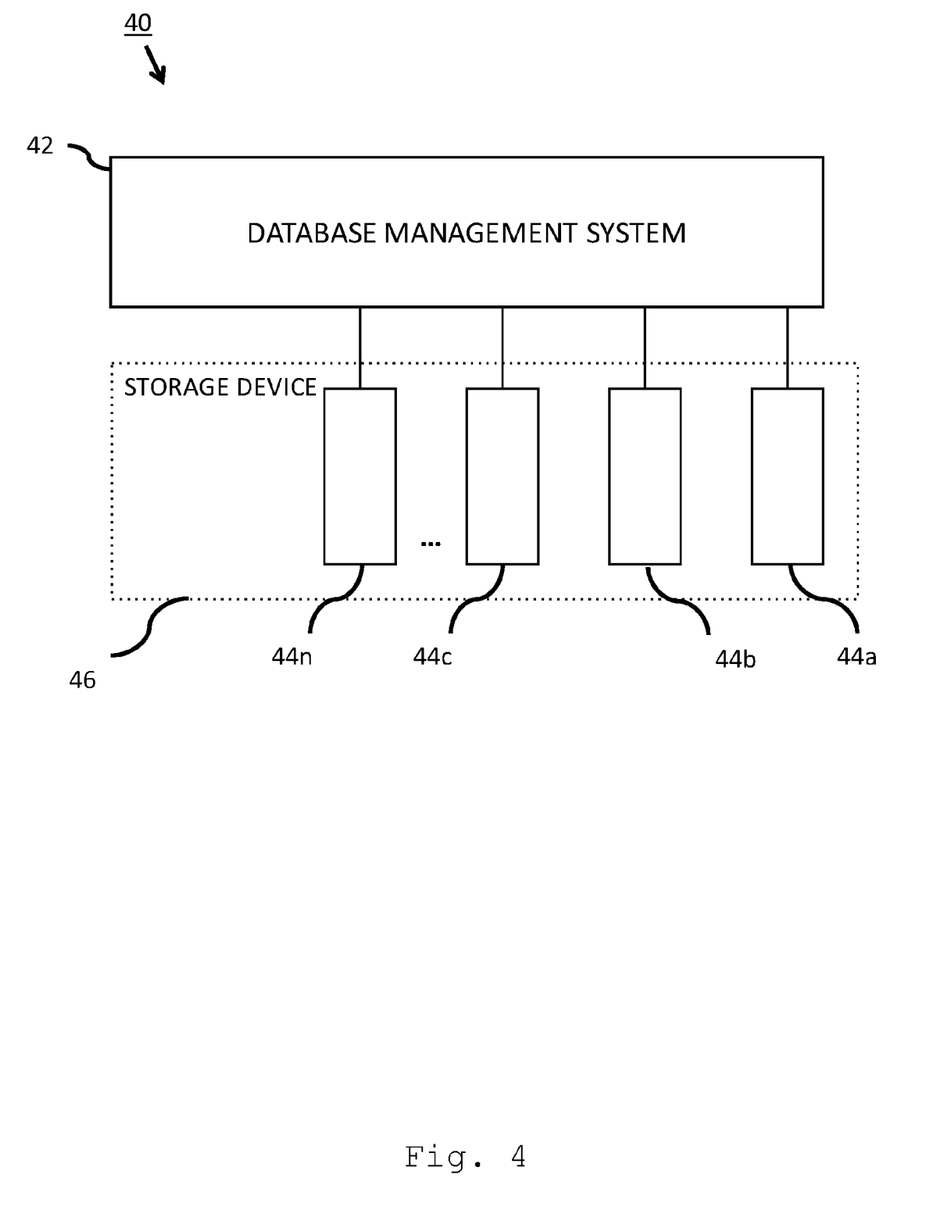
FIG. 4 illustrates a database management system of the invention in coordination with pre-allocated empty files.
Figure 5:
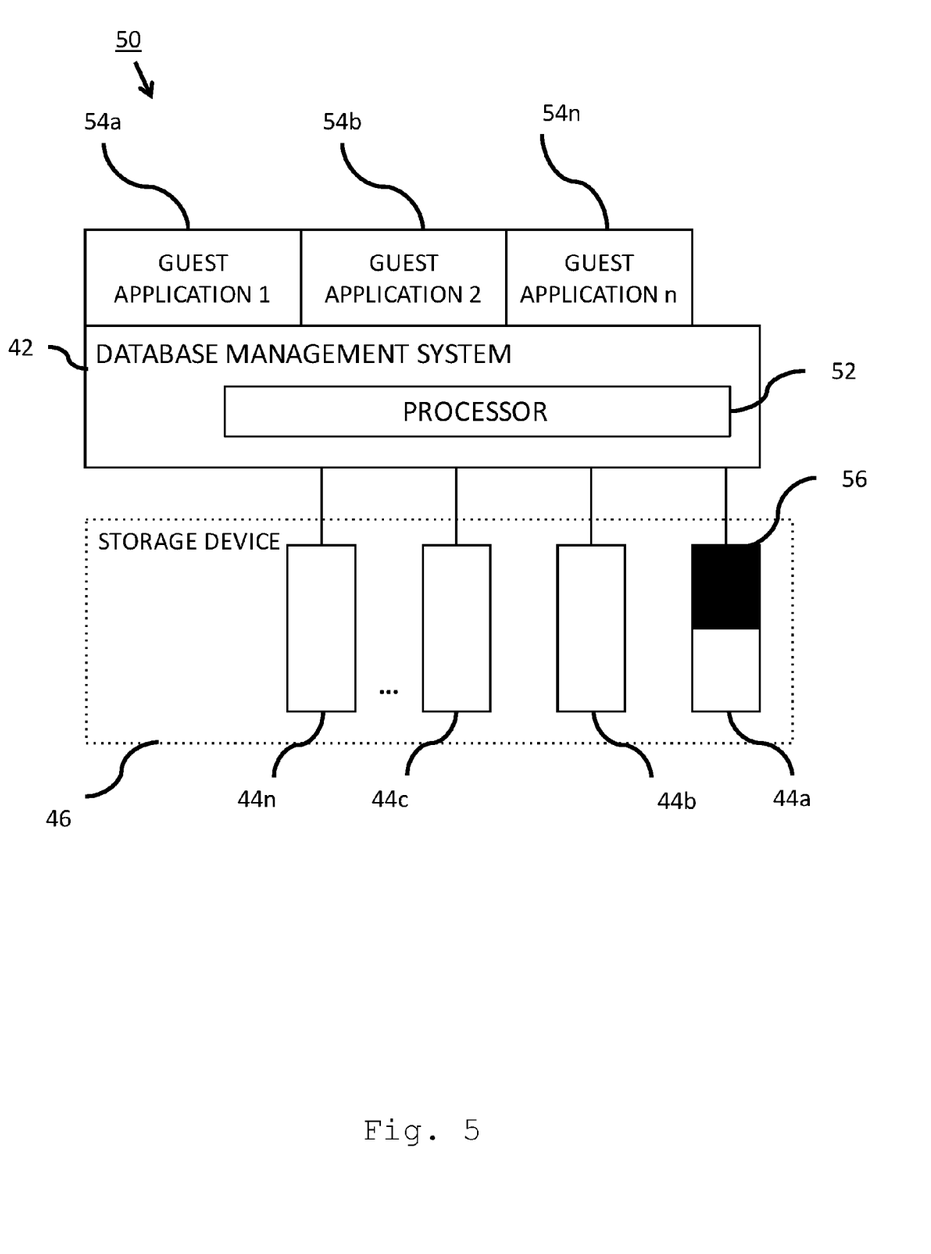
FIG. 5 is a schematic illustration of the relationship between the guest applications, the database management system and the pre-allocated files, of the file system while operating.

The present invention operates by pre-allocating large sizes of memory from boot, thus forcing the operative system to pre-allocate most of the continuous available blocks. Database management system (DBMS) 42 coordinates data storage into storage device 46 as shown in FIG. 4. Storage device 46 includes a plurality of empty files 44a-44n. Each of the empty files 44a-44n having a pre-determined file size. Processor 52 is used for pre-allocating a plurality of empty files 44a-44n and overwriting sequentially empty files 44a-44n with a plurality of data blocks 56, each of data blocks 56 having a pre-determined size as shown in FIG. 5.

This memory pre-allocation occurs on mass storage devices by storing large files and filling them with empty fixed sized data blocks. This pre-allocation can also occur in RAM.

The pre-allocation is done using a heuristic algorithm that observes the amount of writes over time and defines the most suitable file size that will avoid fragmentation.

When the system initiates for the first time, the heuristic algorithm will create a plurality of empty files with a pre-determined files size, for example of 1 GB each. Each file is then assigned to a segment of the virtual memory with a direct byte-to-byte correlation with portions, data blocks, of the physical file. The system will sequentially keep track of all the overwriting operations as well as maintain a pointer to the location of the last write operation.

With file continuous memory, fixed size data blocks, and the overwriting sequential process, the scanning of the entire file will require fewer computations thus making the system considerably faster.

This process applies for any mass storage devices such as hard drive, RAID array, flash memory or solid-state data storage device.

To further increase the optimization and efficiency in the speed of processing operations, the present invention changes the logic and procedures used to create and maintain a file system (including all files and directories) within mass storage device.

Database management system DBMS 42 only stores fixed sized data blocks 56. So all data must be organized in powers of two, i.e. 16-bytes, 32-bytes, 64-bytes or 128-bytes data blocks. While possible to have larger data blocks it might have adverse effects on performance.

Because empty files 44a-44n have already been created in mass storage device 46, by writing zero filled data, the subsequent operations have only to perform overwrites. These overwrites are facilitated because all data blocks 56 have a fixed size and database management system 42 only works with virtual memory with a direct byte-to-byte correlation as previously mentioned. Therefore, these overwrites will not cause any further fragmentation keeping the system performance as it was before the file's creation.

Figure 6A:
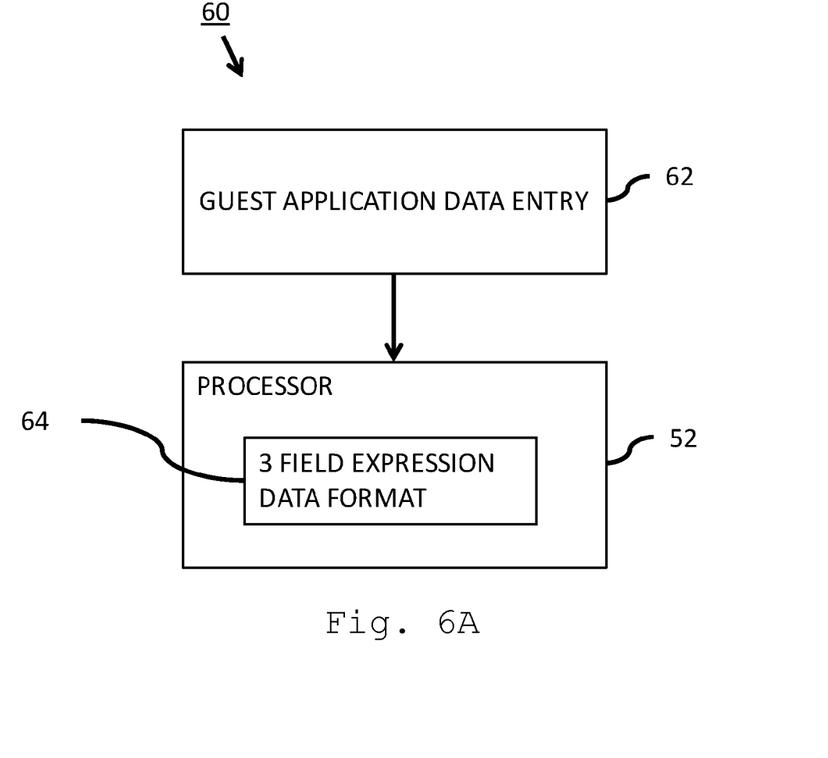
FIG. 6A illustrates a guest application data entry and its representation in the DBMS grammar.
Figure 6B:
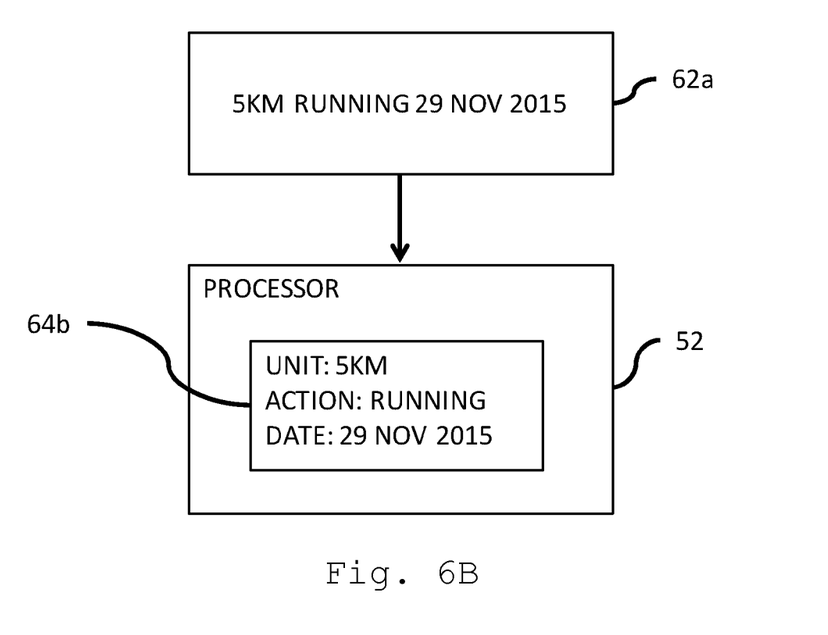
FIG. 6B is an example of a guest application data entry and its representation in the DBMS grammar.
Figure 7:
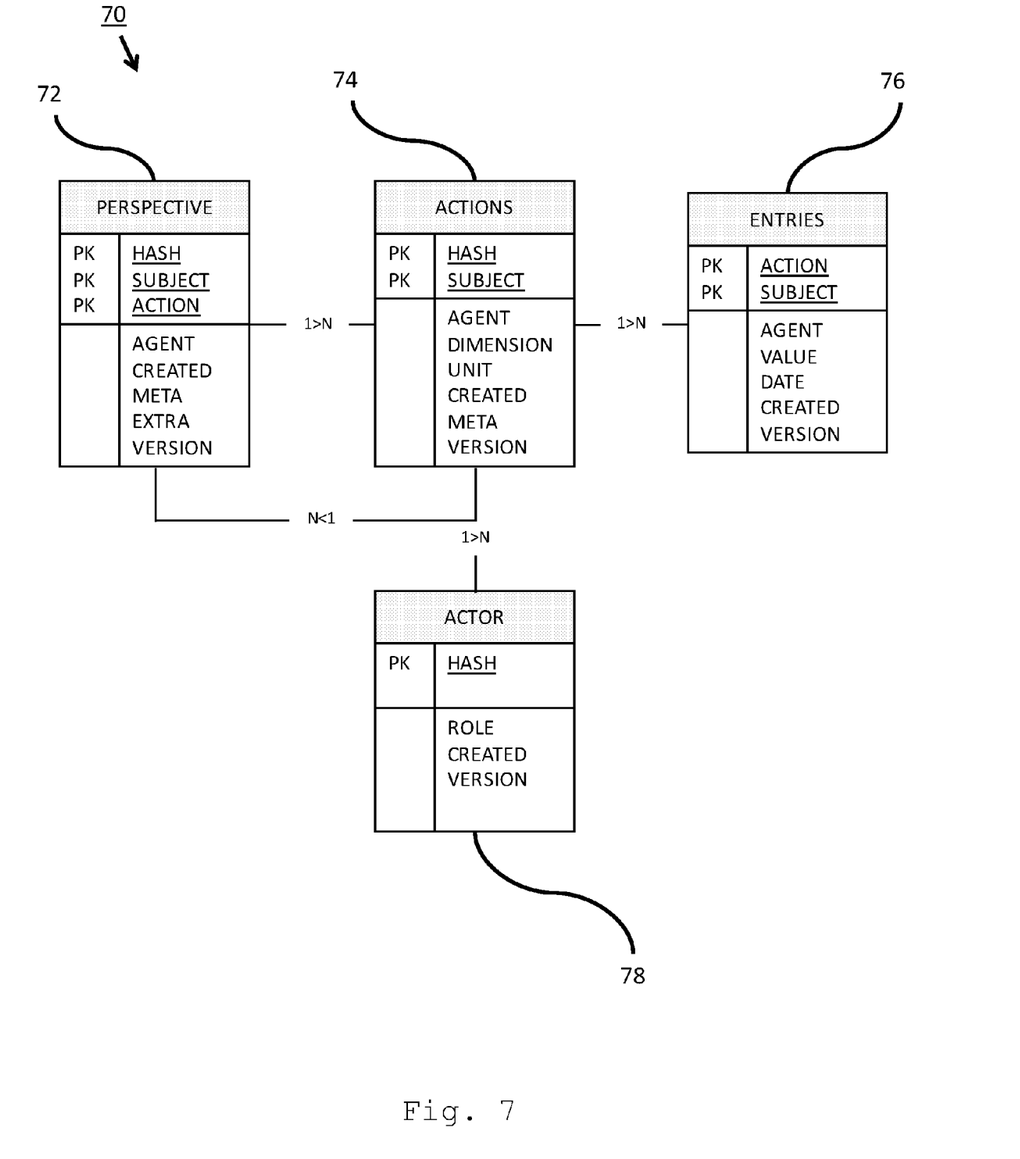
FIG. 7 is an example of a DBMS metadata set of the invention.

In reference to FIG. 5-FIG. 7, the logical component of the invention comprises database management system (DBMS) 42, which is defined by a structured representation of the data provided by guest applications 54a-54n, such as by means of user entries, and a set of metadata that defines the way that the data is organized on mass storage device 46. Set of metadata 70 comprises structures of information that describes, identifies, locates, manages and retrieves the data from each of the guest application 54a-54n.

All data stored by database management system DBMS 42 can be accessed concurrently by different users of different guest applications 54*a*-54*n*, thus allowing multiple applications running at the same time.

Regardless of the business logic applied, the guest application data entry events in database management system DBMS 42 must be performed in a specific data format. This data format operates as a grammar for database management system DBMS 42 to store the events and relate them with others.

This grammar is an expression comprising at least three fields of UNIT-ACTION-DATE. Although this is not limited to these three fields, the more fields are used the poorer will be the performance results. For example, in a sports management guest application, which tracks running activities, the users can input in database management system DBMS 42 their daily sports events like "5 KM running Nov. 29, 2015" 62*a*. This event is processed in processor 52 into expression UNIT-ACTION-DATE having fields 64. In the example shown in FIG. 6B, expression 64*b* is made of a UNIT of "5 Km", an ACTION of "running" and a DATE of "Nov. 29, 2015".

This grammar defines the data format used in database management system DBMS 42, and it is able to describe guest entry 62 which is any type of observable event. Since the structure of the expression is fixed, the resulting data thereof will always have the same size. In a preferred embodiment, the size of each stored block of data entry, after it has been processed by database management system DBMS 42, is fixed at 64 bytes. However, any possible size within the range of the pre-allocated storage can be used. For example, for each 1 GB (1073741824 bytes) file pre-allocated on a mass storage, database management system DBMS 42 of the present invention will store 16.7 million data entries (1073741824/64).

The order in which the fields are inserted by the guest application and subsequently interpreted by database management system DBMS 42 is immutable. A validation procedure verifies that all data blocks are correct and conform to the grammar.

The above-mentioned grammar allows the input of structured and/or unstructured data, since the description of the event is performed in natural language (any human language) or programming language, without constrains or a priori characterization of the events. FIG. 6 shows one example of data entry by a guest application and its segmentation into the required data format in database management system DBMS 42.

The UNIT field comprises two sections:
Value—described by a integer number (ex. 20) or decimal number (ex. 5.345). By default, if no number is inserted, the section Value is assumed to be one.
Value_unit—assumes any form of known or unknown unit.

Database management system DBMS 42 understands all the units in the International System of Units (SI). Independently of the value unit, the database identifies its SI unit of measure cluster and converts it to its SI basic unit from which all other SI units are derived.

As an example, for the data entry "10 KM running today", database management system DBMS 42 will assign the term "10 Km" to the UNIT field, from which it will be converted into meters (since in this example the field UNIT belongs to the SI unit of measure of length) before it is stored by database management system DBMS 42.

For the case of unknown units, for example "5stars", database management system DBMS 42 identifies, stores and incorporates "stars" as a new unit, allowing the creation of customized unit system of any kind as long as it follows the unit syntax structure <value><value_unit>. Thus, for the given example, "5stars", the database is able to process and quantify, for example, the entry "5stars article XPTO classification" as a unit that quantifies the quality of a given article, without prior data schema or similar.

When the guest application inserts the data in the UNIT field, no spaces between the value and the value_unit sections should be given in order to allow a fast segmentation between the three different grammar fields. Spaces between said two sections are allowed but at cost of performance decreasing.

ACTION is the grammar field where the event description other than unit and date is allocated. This is the only mandatory and required field to produce a valid data entry in database management system DBMS 42.

The ACTION field allows data entry in the form of natural language and/or programming language. It can have one or multiple characters and alphanumeric characters.

This field is case-insensitive and allows event description in any language. This fact provides even more flexibility to database management system DBMS 42, its adaptation to the real world and data context.

The field DATE provides the time context for each event. By default, the DATE format comprises day, month, year, hour, minutes and seconds. In order to include other time formats, for example "yesterday" or "in two weeks", database management system DBMS 42 can be provided with a parser for converting this into the default date format.

To provide context to the described grammar, an ACTOR and its PERSPECTIVE regarding each event must be inputted by a guest application in database management system DBMS 42.

The field ACTOR comprises two roles: the instances (AGENTS) that create the event and/or the instances (SUBJECTS) to which the event concerns. By instances it is understood anything or anyone defined by the guest application, for example the instances may be a human person, a machine, hardware, software, etc.

In database management system DBMS 42, the field ACTOR allows a dynamic network construction of the event related instances, enabling the interrelation thereof. In result, complex event network is built in a simple manner.

PERSPECTIVE can be described as tags. Tags categorize and group events, giving meaning and context to the ACTIONS of a given ACTOR. For each ACTION no limit of tags exists. This approach provides flexibility to database management system DBMS 42 to work with structured or unstructured data, without the need of prior framework developments in database management system DBMS 42.

This type of data categorization allows for a near real-time process to combine and represent data, which results in data consistency and improved analytics in complex structures.

There are data blocks 56 defined to assemble the data format fields of database management system DBMS 42. Preferably, each data block 56 has a fixed size of 64 bytes. Data blocks 56 are organized by a metadata set 70 comprising the following structures: ACTIONS 74, ACTOR 78, PERSPECTIVE 72, and ENTRIES 76.

It will be appreciated that database management system DBMS 42 depicted in FIG. 4 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

Embodiments of the present invention may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention. For example, in an embodiment, the invention provides a program product stored on a computer-readable medium, which when executed, enables a computer infrastructure to establish a database management system. To this extent, the computer-readable medium includes program code, such as database management system DBMS 42, which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, and/or as a data signal traveling over a network (e.g., during a wired/wireless electronic distribution of the program product).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

With reference to FIG. 7, the above-mentioned data blocks are hereinafter described. Each of the data blocks comprises a number of attributes:

ACTIONS 74
- Hash—hash value of ACTION. It identifies the key-value pair containing the string that defines the ACTION;
- Subject—single identifier of the SUBJECT who owns this event;
- Agent—hash unique identifier of ACTOR that created this ACTION;
- Dimension—identifier of the measure unit (time, distance, mass, etc.) for this ACTION;
- Unit—unit value identifier. For example, if the attribute Dimension is time, then the unit can be hours, minutes, seconds, etc.;
- Created—Date on which this ACTION has been recorded by the DBMS;
- Meta—Free attribute to be defined by the programmer to further improve or adapt the structure to the metadata set;

Version—Attribute for registering the DBMS version of which this ACTION is part.

For one ACTION 74 there can be a plurality of entries. For the first time that a new ACTION is provided, the DBMS stores all the attributes regarding the ACTION 74 and ENTRIES 76 data blocks. Then, for subsequent entries for the same ACTION, instead of repeating all the attributes defined for the ACTION 74, the DBMS creates a new entry for this ACTION 74 by updating only the Value and Date attributes within the data block ENTRIES 76 (described below). As a consequence, less computation time and storage space is needed. Furthermore, this allows for a time series representation of the ACTION 74, enabling faster analytics computation.

ACTOR 78
Hash—this is a unique ACTOR identification. This attribute identifies all the instances that are part of the guest application
Role comprises:
  a role AGENT. Only authorized instances by the guest application can be AGENTS; or
  a role SUBJECT. All instances are set by default as SUBJECTS;
Created—Date on which this ACTOR has been recorded by the DBMS;
Version—Attribute for registering the DBMS version of which this ACTOR is part.

An AGENT is an active element in the DBMS, since it is the one that creates the event, and the SUBJECT is a passive element in the database, since it only receives events from an agent.

PERSPECTIVE 72
Hash—unique hash value of the PERSPECTIVE;
Action—relates to the attribute Hash of the structure ACTION;
Subject—unique identifier of the SUBJECT who owns this PERSPECTIVE;
Agent—relates to the attribute Hash of the structure ACTOR.
Created—Date on which this PERSPECTIVE has been recorded by the DBMS.
Meta—Free attribute to be defined by the programmer to further improve or adapt the structure to the metadata set;
Extra—64-bits to store any extra data;
Version—Attribute for registering the DBMS version of which this PERSPECTIVE is part.

For each PERSPECTIVE 72 there can be a plurality of ACTIONS 74. A plurality of PERSPECTIVES 72 can exist for each ACTOR 78.

ENTRIES 76
Action—relates to the attribute Hash of the structure ACTION;
Subject—single identifier of the SUBJECT who owns this event;
Agent—hash unique identifier of the ACTOR that created this ENTRY;
Value—Relates to the value of this ENTRY. These values are stored in the basic unit as previously described. For example, all ENTRIES in time are stored in the unit "seconds";
Date—The date related to the record of this ENTRY;
Created—Date on which this ENTRY has been recorded by the DBMS;
Version—Attribute for registering the DBMS version of which this ACTION is part.

To represent the original data describing each event, the DBMS converts the string of characters into a key-value pair (as above mentioned in connection with the attributes). This conversion is known in the art as "hashing". The advantage on using hashing in the DBMS is to assist in improvement of the performance, since it is faster to find any type of data using a key-value than using the original string of characters.

An example of use of method 10 and database management system 42 is provided below.

Figure 8:
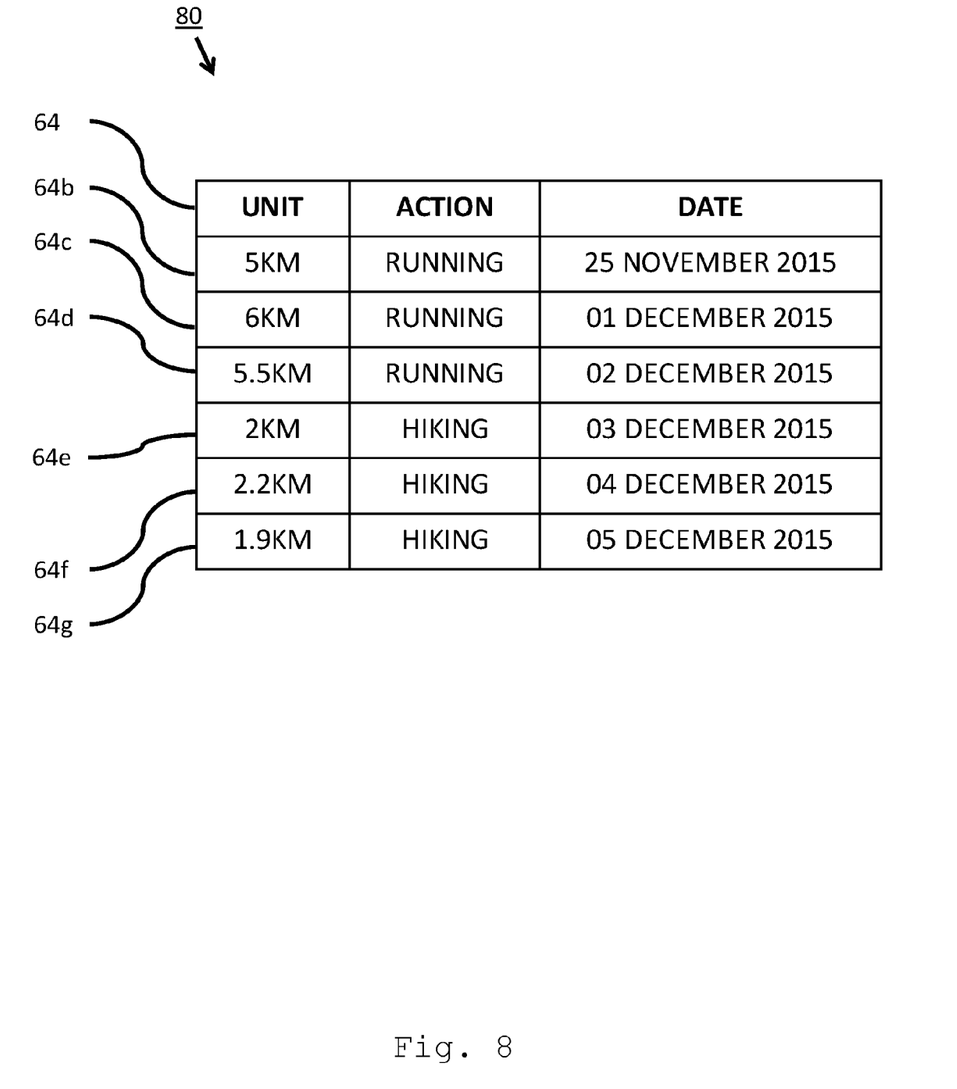
FIG. 8 is a set of multiple data entries from a guest application example.

This example is related to data directed to a sports management application. Referring to FIG. 5, in this example guest application 54*a* is used to enter data into database management system 42. In this example data comes into guest application 54 as a human readable sentence and is parsed into dataset 80 as expressions including unit, action and date as 64*a*-64*g* as shown in FIG. 8.

Figure 9:
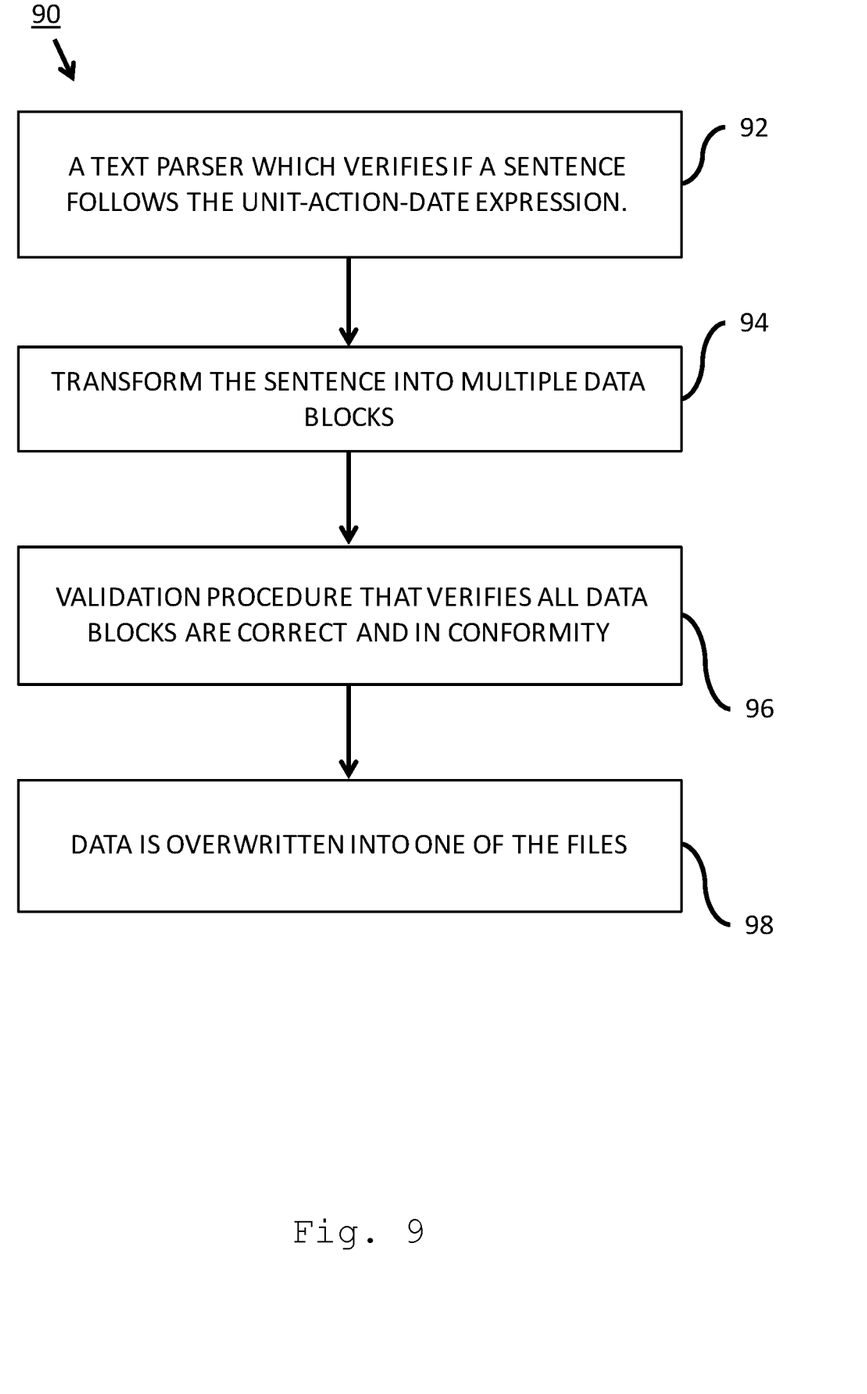
FIG. 9 shows a flow diagram illustrating an embodiment for overwriting dataset into one of the files.

FIG. 9 is a flow diagram illustrating an embodiment for overwriting dataset 80 into one of the files. In step 92, a text parser verifies if a sentence follows the unit-action-date grammar. If the sentence does not contain all fields of the grammar, default values can be added to the unit and date fields. In step 94, the sentence is transformed into multiple data blocks. In step 96, a validation procedure verifies all data blocks are correct and conform to the predefined expression or grammar. In step 98, the verified data is overwritten into one of the files.

Figure 10:
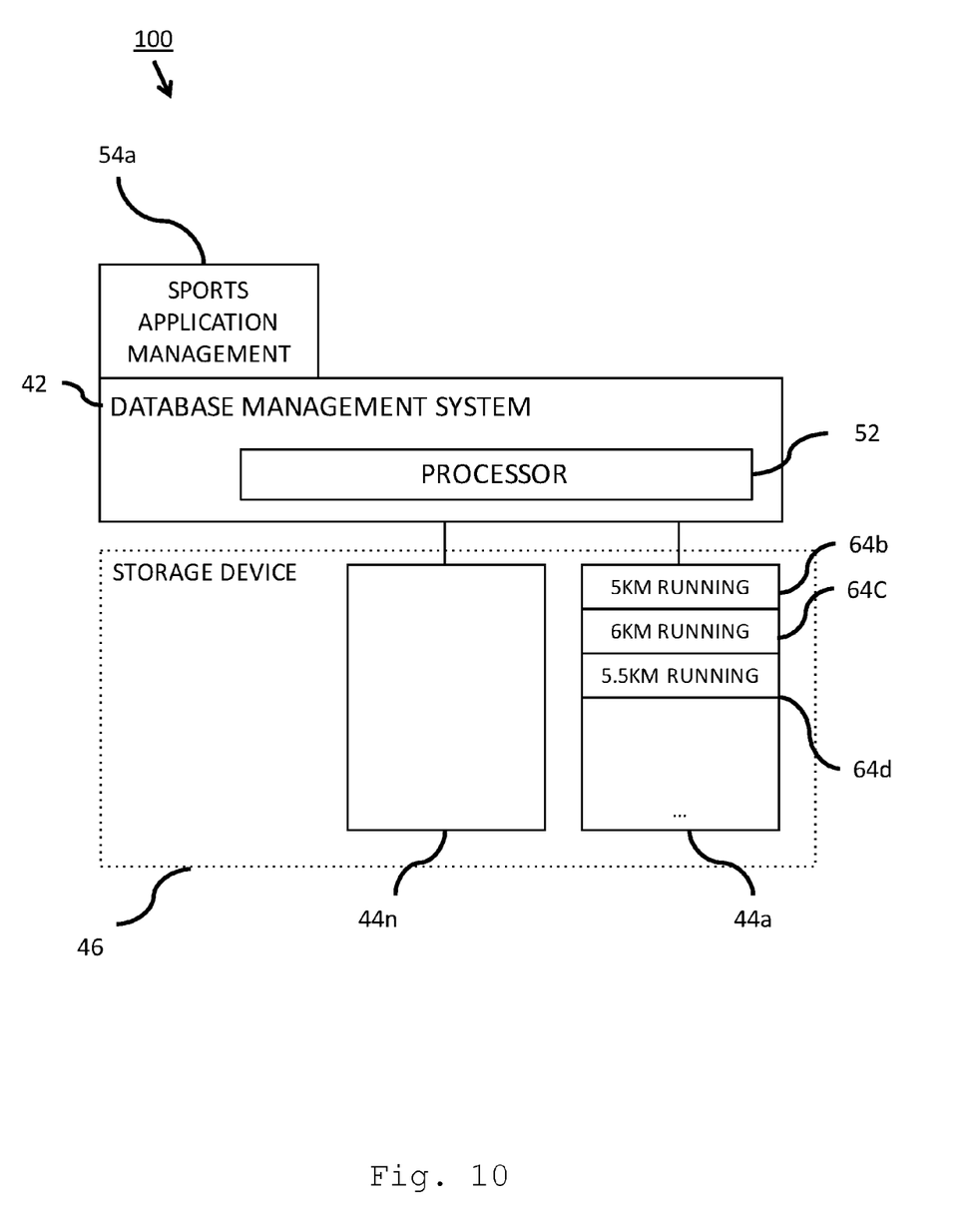
FIG. 10 illustrates an embodiment of the invention for a sports management guest application example.

FIG. 10 illustrates an embodiment for parsing and overwriting data blocks 100.

Data blocks 64*b*, 64*c* and 64*d* are overwritten sequentially on pre-allocated empty file 44*a*.

Once data blocks 64*b*-64*d* are overwritten on empty file 44*a* it can later be retrieved and then interpreted as time-series.

Figure 11:
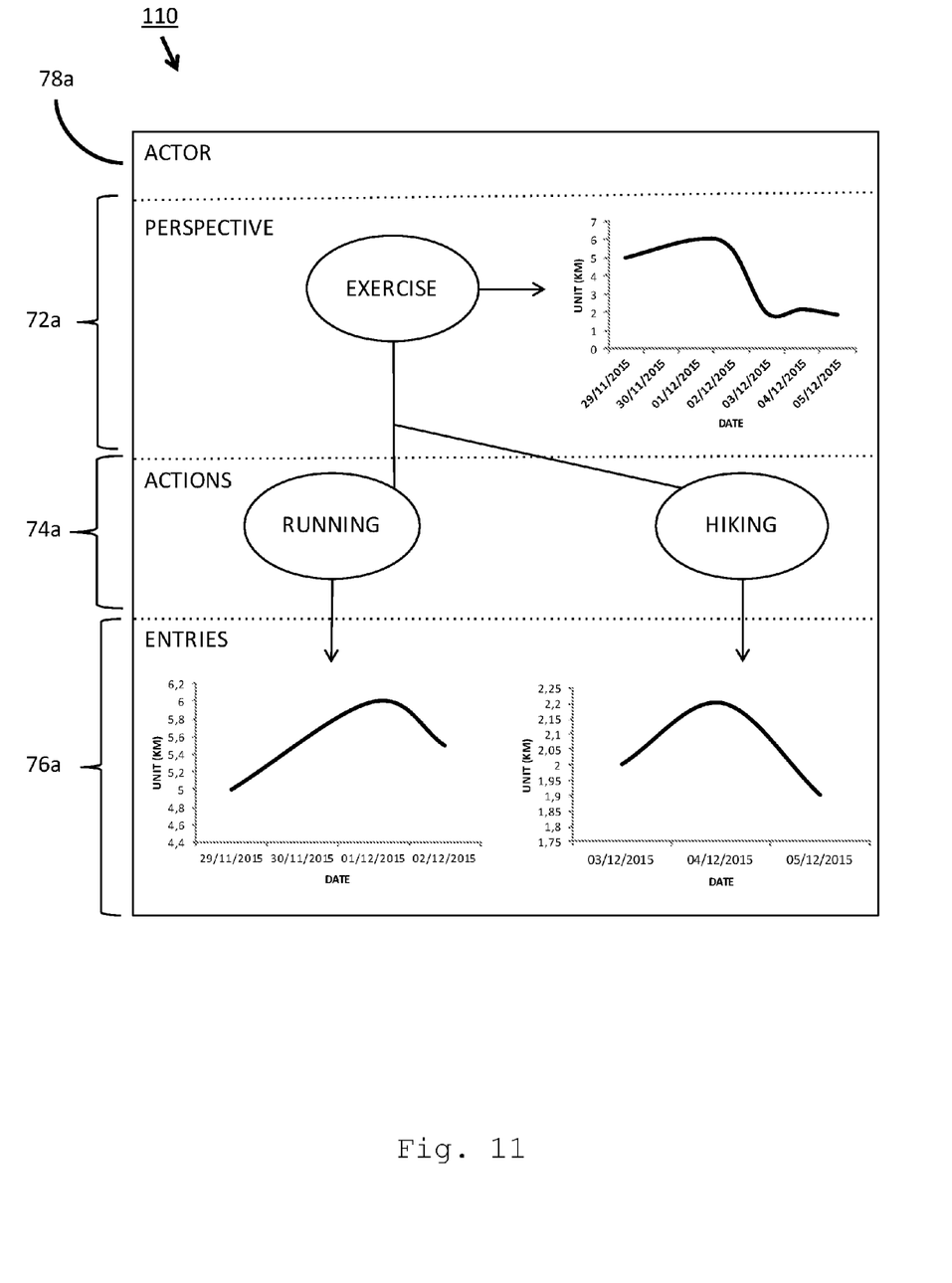
FIG. 11 shows different actions which originate different entries in the form of time-series for a given Actor of the example of the sports guest application of FIG. 10.

FIG. 11 is an example 110 showing different actions 74*a* which originate different entries in the form of time-series 76*a* for Actor 78*a*. Perspective 72*a* is shown for exercise including running and hiking for Actor 78*a*. Perspective 72*a* is a combination of two time-series.

For this example, for a dataset of 116 136 379 events, from May 1, 2015 to Sep. 30, 2015, the following data retrieval events were performed:

1. Scan the whole dataset filtering by any of the fields such as unit, action, and date. The execution time for each of fields was 141 milliseconds.
2. Return a perspective of all data grouped by perspective. The execution time for the perspective was 305 milliseconds.
3. Average values between a given date range grouped by a given interval. The execution time for this example was 151 milliseconds.
4. Ratio between 2 fields given a date range. The execution time for this example was 382 milliseconds.

The present invention has the advantage of improved processing speed over known databases/systems of prior art while needing less disk storage space.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the scope of the invention.

What is claimed is:

1. A computer implemented method for storing data on a storage device and retrieving data from the storage device comprising the steps of:

a. pre-allocating in a processor a plurality of empty files at the storage device, each of the empty files having a pre-determined file size;
b. overwriting sequentially in a processor the empty files with a plurality of data blocks, each of the data blocks having a pre-determined size, the data blocks being defined by an event, the event comprising an expression, the expression comprising at least three fields, the fields being a unit, an action and a date; and being
assigned to the event an agent that created the event and a subject to which the event concerns; and
c. retrieving overwritten data blocks from the storage device.

2. The method of claim 1 wherein all of the data blocks have a fixed size.

3. The method of claim 2 wherein the size of the data blocks are powers of two and a predetermined number of the data blocks are overwritten in the empty files.

4. The method of claim 3 wherein the size of each of the empty files is 1 GB and the size of each of the data blocks is 64 bytes.

5. The method of claim 1 wherein the date is a date related to the event.

6. The method of claim 1 wherein the step c. of retrieving overwritten data blocks is based on one or more of the expression, the agent and the subject.

7. The method of claim 1 further comprising the steps of:
assigning an actor to either the agent or the subject;
grouping the events the actor has access to as a perspective;
wherein the step c. of retrieving the overwritten data blocks is based on the perspective.

8. The method of claim 1 wherein the data blocks comprise a key value pair and the step c. of retrieving the overwritten data blocks is based on the key value pair.

9. The method of claim 1 further comprising the step of:
updating the overwritten data blocks with a plurality of new data blocks by overwriting the overwritten data blocks.

10. A non-transitory computer readable medium including software instructions which when executed by a processor performs a method comprising:
pre-allocating a plurality of empty files at a storage device, each of the empty files having a pre-determined file size;
overwriting sequentially the empty files with a plurality of data blocks, each of the data blocks having a pre-determined size, the data blocks being defined by an event, the event comprising an expression, the expression comprising at least three fields, the fields including a unit, an action and a date and being
assigned to the event an agent that created the event and a subject to which the event concerns; and
retrieving overwritten data blocks from the storage device;
wherein retrieving the overwritten data blocks is based on one or more of the expression, the agent and the subject.

11. The non-transitory computer readable medium of claim 10 further comprising:
assigning an actor to either the agent of the subject; and
grouping the events the actor has access to as a perspective;
wherein retrieving the data blocks is based on the perspective.

12. A non-transitory computer program product, wherein computer instructions stored in a non-transitory computer readable a memory when executed by a processor of a database management system performs a method comprising:
pre-allocating a plurality of empty files at a storage device of the database management system, each of the empty files having a pre-determined file size;
overwriting sequentially the empty files with a plurality of data blocks, each of the data blocks having a pre-determined size,
the data blocks being defined by an event, the event having an expression, the expression having at least three fields, the fields including a unit, an action and a date and being
assigned to the event an agent that created the event and a subject to which the event concerns; and
retrieving overwritten data blocks from the storage device;
wherein retrieving the overwritten data blocks is based on one or more of the expression, the agent and the subject.

13. The non-transitory computer readable product of claim 12 further comprising:
assigning an actor to either the agent of the subject; and
grouping the events the actor has access to as a perspective;
wherein retrieving the data blocks is based on the perspective.

14. A database management system comprising:
a storage device having a plurality of empty files, each of the empty files having a pre-determined file size;
a processor for pre-allocating the plurality of empty files, overwriting sequentially the empty files with a plurality of data blocks, the data blocks being defined by an event, the event comprising an expression, the expression comprising at least three fields, the fields being a unit, to which the event concerns, and retrieving the overwritten data blocks; each of the data blocks having a pre-determined size.

15. The database management system of claim 14 wherein the storage device is a mass storage device.

16. The database management system of claim 14 wherein the storage device is a volatile memory.

* * * * *